United States Patent [19]
Briggs et al.

[11] Patent Number: 5,356,670
[45] Date of Patent: Oct. 18, 1994

[54] COMPOSITE COATING WITH PRIMARY OR TERTIARY AMINE-BLOCKED AROMATIC SULFONIC ACID CATALYST

[75] Inventors: Rodney L. Briggs, Linden; Donald H. Campbell, Milford; Mark R. Montagne, Southfield, all of Mich.

[73] Assignee: BASF Corporation, Southfield, Mich.

[21] Appl. No.: 999,386

[22] Filed: Dec. 15, 1992

[51] Int. Cl.$^5$ ................................................ B05D 7/16
[52] U.S. Cl. ................................ 427/410; 427/409; 427/412.1
[58] Field of Search ....................... 427/409, 410, 412.1

[56] References Cited

U.S. PATENT DOCUMENTS

| | | | |
|---|---|---|---|
| 3,474,054 | 10/1969 | White | 260/15 |
| 3,960,688 | 6/1976 | Calbo, Jr. | 204/181 |
| 3,979,478 | 9/1976 | Gallacher | 260/850 |
| 4,144,377 | 3/1979 | Gallacher | 428/458 |
| 4,251,665 | 2/1981 | Calbo | 548/215 |
| 4,451,597 | 5/1984 | Victorius | 427/409 |
| 4,546,046 | 10/1985 | Etzell et al. | 427/379 |
| 4,591,533 | 5/1986 | Antonelli et al. | 427/410 |
| 4,650,718 | 3/1987 | Simpson et al. | 428/413 |
| 4,681,811 | 7/1987 | Simpson et al. | 428/413 |
| 4,703,101 | 10/1987 | Singer et al. | 528/87 |
| 4,732,790 | 3/1988 | Blackburn et al. | 427/407 |
| 4,764,430 | 8/1988 | Blackburn et al. | 427/410 |
| 5,100,735 | 5/1992 | Chang | 427/409 |

OTHER PUBLICATIONS
CA Registry File for Cocaomine.

*Primary Examiner*—Shrive Beck
*Assistant Examiner*—Erma Cameron
*Attorney, Agent, or Firm*—Paul L. Marshall

[57] ABSTRACT

A coated article is described comprising a substrate having thereon a color-plus-clear composite coating wherein (a) the color layer of the composite coating is derived from a coating composition comprising:
  (1) a polymer component having active hydrogen-containing groups thereon,
  (2) an aminoplast curing agent,
  (3) an acid cure catalyst, and
  (4) a substituted or unsubstituted alkyl amine having at least one alkyl substituent of at least 8 carbon atoms, and (b) the clear layer of the composite coating is derived from a curable coating composition comprising an epoxy-functional component and an acid-functional or anhydride-functional component.

13 Claims, No Drawings

COMPOSITE COATING WITH PRIMARY OR TERTIARY AMINE-BLOCKED AROMATIC SULFONIC ACID CATALYST

FIELD OF THE INVENTION

This invention relates to coatings, and in particular to color-plus-clear composite coatings, such as those utilized in the automotive industry.

BACKGROUND OF THE INVENTION

Color-plus-clear composite coatings are widely utilized in the coatings art. Color-plus-clear composite coatings are particularly desirable where exceptional gloss, depth of color, distinctness of image, or special metallic effects are desired. The automotive industry has made extensive use of color-plus-clear composite coatings for automotive body panels. Such coatings, however, require an extremely high degree of clarity in the clearcoat to achieve the desired visual effect. There is a continuing need in the art for the development of clearcoats for composite coatings that will exhibit the desired clarity for long periods of time under exposure to a variety of conditions.

Clearcoats utilizing a carboxy-epoxy cure mechanism or an anhydride-epoxy cure mechanism have been proposed for composite coatings. These clearcoats are described, for example, in U.S. Pat. Nos., 4,650,718; 4,681,811; 4,703,101; and 4,732,790. This type of curing depends on a reaction between a compound having epoxy-functional group(s) and a curing agent having carboxy-functional group(s) or anhydride-functional group(s). By way of an oxirane ring-opening reaction between the carboxy or anhydride groups and the epoxy groups, a matrix of chemical bonds is formed, resulting in a hard cured coating.

Basecoat coating compositions used in color-plus-clear composite coatings utilize a polymeric component and a curing agent. The polymeric component typically has active hydrogen-containing groups (e.g., hydroxyl) as pendant or terminal groups on a polymeric backbone (e.g., polyurethane or acrylic). The curing agent is typically an aminoplast such as melamine formaldehyde resin, which may be partially or fully alkylated. Coating compositions that rely on aminoplast curing will also usually contain a strong acid catalyst. Commonly-used catalysts include aromatic sulfonic acids (e.g., p-toluenesulfonic acid, dinonylnaphthalenedisulfonic acid, dodecylbenzenesulfonic acid), phenyl acid phosphate, monobutyl maleate, butyl phosphate, and hydroxy phosphate ester.

Basecoat coating compositions such as those described above containing acid cure catalysts often utilize an amine group-containing compound to improve the stability and/or shelf life of the coating composition. Amine group-containing compounds used in the art are typically lower alkyl tertiary amines or certain heterocyclic amines such as oxazolidine. It is believed that the amine compound complexes with the acid catalyst, thus preventing premature onset of the curing reaction. Upon heating during cure, the amine complex dissociates, liberating the acid functionality to act as a cure catalyst.

However, when basecoat compositions stabilized with amine group-containing compounds as described above are used in combination with clearcoats utilizing a carboxy-epoxy or anhydride-epoxy cure mechanism, severe defects can result during curing. Such defects can be described as a pop, blister, crater, or blowout. The defects are often characterized by a discontinuity in the coverage of the clearcoat that may be surrounded by material from the basecoat and/or clearcoat deposited onto the otherwise smooth surface of the clearcoat.

There is thus a need in the art for color-plus-clear composite coatings that provide the desired appearance characteristics while avoiding the above-described problems.

SUMMARY OF THE INVENTION

According to the present invention, there is provided a color-plus-clear composite coating wherein
(a) the color layer of the composite coating is derived from a coating composition comprising:
  (1) a polymer component having active hydrogen-containing groups thereon,
  (2) an aminoplast curing agent,
  (3) an acid cure catalyst, and
  (4) a substituted or unsubstituted alkyl amine having at least one alkyl substituent of at least 8 carbon atoms, and
(b) the clear layer of the composite coating is derived from a curable coating composition comprising an epoxy-functional component and an acid-functional or anhydride-functional component.

The coatings according to the invention provide the exceptional gloss, depth of color, distinctness of image, or special metallic effects are desired that is required of modern color-plus-clear composite coatings. Moreover, they exhibit a low degree of susceptibility to the coating defects suffered by other composite coatings utilizing aminoplast-cured basecoats and acid-epoxy or anhydride-epoxy cured clearcoats.

DESCRIPTION OF THE PREFERRED EMBODIMENTS

The polymer component having active hydrogen-containing groups thereon can be any of a number of well-known polymers. Such polymers include, for example, acrylic polymers, modified acrylic polymers, polyesters, polyepoxides, polycarbonates, polyurethanes, polyamides, polyimides, and polysiloxanes, all of which are well-known in the art. Preferably, the polymer is an acrylic, modified acrylic or polyester. More preferably, the polymer is an acrylic polymer. Active hydrogen-containing groups on polymer backbones are well-known in the art. They include, for example, hydroxyl groups, amide groups, urea groups, carbamate groups, and the like.

In one preferred embodiment of the invention, the polymer is an acrylic (including methacrylic). Such polymers are well-known in the art, and can be prepared from monomers such as methyl acrylate, acrylic acid, methacrylic acid, methyl methacrylate, butyl methacrylate, cyclohexyl methacrylate, and the like. The active hydrogen-containing group, e.g., hydroxyl, can be incorporated into the ester portion of the acrylic monomer. For example, hydroxy-functional acrylic monomers that can be used to form such polymers include hydroxyethyl acrylate, hydroxybutyl acrylate, hydroxybutyl methacrylate, hydroxypropyl acrylate, polyethylene glycol methacrylate, and the like. Amido-functional acrylic monomers would include acrylamide and methacrylamide. Carbamate-functional acrylic monomers are described in U.S. Pat. No. 3,479,328. Other acrylic monomers having active hydrogen-containing groups in the ester portion of the monomer are also within the skill of the art.

In an alternative embodiment, the active hydrogen-containing group can be incorporated onto the polymer backbone by forming the polymer backbone with a group that can be reacted with another compound to form the active hydrogen-containing group. For example, an isocyanate group on a polymer backbone can be reacted with a hydroxyalkyl carbamate to form a carbamate-functional polymer. An example of an isocyanate group-containing monomer for forming a polymer backbone having an isocyanate group attached thereto is unsaturated m-tetramethyl xylene isocyanate (sold as TMI ® by American Cyanamid).

Modified acrylics can also be used as the polymer (a) according to the invention. Such acrylics are typically polyester-modified acrylics or polyurethane-modified acrylics, as is well-known in the art. An example of one preferred polyester-modified acrylic is an acrylic polymer modified with $\epsilon$-caprolactone. Such a polyester-modified acrylic is described in U.S. Pat. No. 4,546,046 of Etzell et al, the disclosure of which is incorporated herein by reference. Polyurethane-modified acrylics are also well-known in the art. They are described, for example, in U.S. Pat. No. 4,584,354, the disclosure of which is incorporated herein by reference.

Polyesters having hydroxyl groups, acid groups, or amino groups as isocyanate-reactive groups can also be used as the polymer in the composition according to the invention. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

Aminoplast curing agents are also well-known in the art. Examples of useful aminoplast curing agents include melamine formaldehyde resin (including monomeric or polymeric melamine resin and partially or fully alkylated melamine resin such as methylated or butylated melamine formaldehyde resin), urea resins (e.g., methylol ureas such as urea formaldehyde resin, alkoxy ureas such as butylated urea formaldehyde resin), benzoguanamine resin, ethylene diamine resin, etc.

The cure catalyst used in the color layer of the composite coating according to the invention can be any of a number of acids or combinations of acids known in the art to catalyze aminoplast/active hydrogen curing. These include inorganic Bronsted (i.e., proton donor) acids such as hydrochloric acid, sulfuric acid, organic Bronsted acids such as aromatic sulfonic acids (e.g., p-toluenesulfonic acid, dinonylnaphthalenedisulfonic acid, dodecylbenzenesulfonic acid, phenyl acid phosphate, monobutyl maleate, butyl phosphate, and hydroxy phosphate ester). Strong acids such as those listed above are preferred, although weak acids such as carboxylic acid or acrylic acid included as part of the polymer component may also be used. Lewis acids such as $ZnCl_2$, $BF_3$, $AlCl_3$, $MgBr_2$, $ZnNO3$, and zinc naphthenate may also be used.

The color layer coating composition also includes a substituted or unsubstituted alkyl amine having at least one alkyl substituent of at least 8 carbon atoms. Amines are known to be used in acid-catalyzed coating compositions to improve stability, however, the novel use of an alkyl amine having greater than 8 carbon atoms in one of the alkyl groups in basecoats in combination with acid- or anhydride-epoxy clearcoats can provide unexpected advantages such as improved resistance to blowout during cure. While the present invention does not depend on and should not be construed as limited by any particular chemical theory, it is believed that amines may form stable complexes with acid catalysts. These complexes then dissociate upon heating during cure to release the acid for catalysis.

A variety of substituents can be used on the amines used in the practice of the invention, as long as they do not have a deleterious effect on the performance of the invention. Useful substituents are typically of 1–10 carbon atoms, and include alkyl (e.g., methyl, ethyl, pentyl), alkoxy (e.g., methoxy, butoxy), alkanol (e.g., methylol, 4-butylol), halogenated alkyl (e.g., 3-chloropropyl), aralkyl (e.g., benzyl, 2-methylphenyl), and the like. Examples of amines useful in the practice of the invention include 2-ethylhexyl amine, dimethyl octylamine, dodecylamine and dimethyl dodecylamine. Examples of amines useful in the practice of the invention, where the amine is in admixture with other amines, include cocoamine, 3-($C_8$–$C_{10}$ alkoxy)propylamine, hydrogenated tallow amine, dimethyl hydrogenated tallow amine and dimethyl cocoamine.

The color layer of the invention will generally include one or more pigments, which can be incorporated as pastes prepared by using grinding resins or pigment dispersants according to methods well known in the art. The term "pigments" is meant to encompass organic and inorganic compounds that are colored materials, fillers, metallic and flake materials, and other materials known in the art. If pigments are included, they are usually used in an amount of 1% to 200% based on the total solid weight of the reactants.

The clear layer according to the invention comprises an epoxy-functional component and an acid-functional or anhydride-functional component. Such clear layer coating compositions for composite color-plus-clear coatings are well-known in the art and are described, for example, in U.S. Pat. Nos. 4,650,718; 4,681,811; 4,703,101; 4,764,430; 4,927,868; 5,035,925; 4,732,790, and 4,755,581, the disclosures of which are incorporated herein by reference.

Either or both of the epoxy-functional component and the acid- or anhydride-functional component may be polymeric, oligomeric, or a non-polymeric compound, although in a preferred embodiment, one is polymeric and the other is either oligomeric or non-polymeric. In a more preferred embodiment, the epoxy-functional component is polymeric and the acid- or anhydride-functional component is non-polymeric.

The epoxy-functional component can be an epoxy-functional acrylic polymer, which is preferred, an epoxy condensation polymer (e.g., polyglycidyl ether of alcohol or phenol), or a polyepoxide monomer or oligomer.

In one preferred embodiment, the epoxy-functional component is an epoxy-functional acrylic polymer or oligomer. Illustrative examples of epoxy-functional acrylics are copolymers of an ethylenically unsaturated monomer containing an epoxy group. The copolymers may be prepared by using conventional techniques such as free radical polymerization or anionic polymerization in, for example, a batch or semi-batch process.

Examples of the ethylenically unsaturated monomers containing an epoxy group can be glycidyl acrylate, glycidyl methacrylate, and allyl glycidyl ether. Other copolymerizable monomers can be alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, cyclohexyl monoepoxy methacrylate, and the like; vinyl monomers such as styrene, vinyl toluene and the like.

Useful polyepoxides, such as polyglycidyl methacrylates, preferably have weight per epoxides of 200 to 10,000, more preferably from 300 to 1000. The polyepoxides typically have a weight average molecular weight in the range of 130 to 40,000, and preferably 130 to 6000. The weight average molecular weight is determined experimentally by gel permeation chromatography using a polystyrene standard. It is therefore not an actual molecular weight, but rather, it indicates that the molecules occupy the same amount of space that a styrene molecule of a known molecular weight would occupy.

The epoxy condensation polymers that can be used as polyepoxides have a 1,2-epoxy equivalency greater than 1, preferably greater than 1 and up to about 3.0. Examples of such epoxides are polyglycidyl ethers of polyhydric phenols and aliphatic alcohols. These polyepoxides can be produced by etherification of the polyhydric phenol or aliphatic alcohol with an epihalohydrin such as epichlorohydrin in the presence of alkali.

Examples of suitable polyphenols are 2,2-bis(4-hydroxyphenyl)propane (bisphenol A), 1,1-bis(4-hydroxyphenyl)ethane, and 2-methyl-1,1-bis(4-hydroxyphenyl)propane. Examples of suitable aliphatic alcohols are ethylene glycol, diethylene glycol, 1,2-propylene glycol and 1,4-butylene glycol. Also, cycloaliphatic polyols such as 1,2-cyclohexanediol, 1,4-cyclohexanediol, 1,2-bis(hydroxymethyl)cyclohexane and hydrogenated bisphenol A can be used.

Besides the epoxy-containing polymers described above, certain polyepoxide monomers and oligomers can also be used. Examples of those materials are described in U.S. Pat. No. 4,102,942 in column 3, lines 1–16. Specific examples of such low molecular weight polyepoxides are 3,4-epoxycyclohexylmethyl-3,4-epoxycyclohexanecarboxylate and bis(3,4-epoxycyclohexylmethyl)adipate. Melamine-based polyepoxide compounds available from Monsanto Co., St. Louis, Mo., under product name designation 'LSE' are also examples of these materials and are preferred.

The acid-functional component can be a monomeric polyacid or an adduct thereof, or it can be a polymeric or oligomeric polyacid. For monomeric polyacids, usually liquid polyacids are employed. Non-limiting examples of these acids are succinic acid, glutaric acid, adipic acid, azelaic acid, oxalic acid, phthalic acid, isophthalic acid, hexahydrophthalic acid, methylhexahydrophthalic acid, maleic acid chlorendic acid and the like. Polyacids of higher acid functionality, e.g., trimellitic acid, tricaballylic acid, aconitic acid and the like, can also be employed.

Higher molecular weight polyacid-functional adducts can also be used. Examples of useful polyacid-functional adducts are acid-functional polyesters, acid-functional polyurethanes, acid-functional acrylics, and the like. An example of the acid-functional polyesters can be prepared by reacting an excess of a monomeric polyacid as described above with a polyol. Alternatively, in a preferred embodiment, a cyclic anhydride (e.g., a 1,2-acid anhydride such as hexahydrophthalic anhydride and alkylhexahydrophthalic anhydride) can be reacted with a polyol, such as 1,6-hexanediol, trimethylol propane and polycaprolactone triol to form a half-ester polyacid curing agent. Such half-ester polyacid curing agents are well-known in the art and are described, for example, in U.S. Pat. No. 4,703,101. Acid-functional products of the anhydride-polyol reaction are more fully discussed in U.S. Pat. No. 4,927,868, which is incorporated herein by reference.

Illustrative examples of acid functional acrylics are copolymers of an ethylenically unsaturated monomer containing an acid group. The copolymers may be prepared by using conventional techniques such as free radical polymerization or anionic polymerization in, for example, a batch or semi-batch process. One or more other ethylenically unsaturated monomers that do not contain an acid group can be incorporated into the acid-functional polymer.

Examples of the ethylenically unsaturated monomers containing an acid group can be acrylic acid, methacrylic acid, itaconic acid, and maleic acid. Other copolymerizable monomers can be alkyl ester of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; vinyl monomers such as styrene, vinyl toluene and the like. Copolymerizable monomers containing groups which will react with the acid groups under the addition reaction conditions chosen should be avoided so as to produce an ungelled product.

The polyacids preferably have acid numbers of 30 to 300, more preferably from 100 to 200. The polyacids may have a weight average molecular weight in the range of 134 to 40,000, and preferably 134–6000. The weight average molecular weight is determined experimentally by gel permeation chromatography using a polystyrene standard. It is therefore not an actual molecular weight, but rather, it indicates that the molecules occupy the same amount of space that a styrene molecule of a known molecular weight would occupy.

Anhydride-functional components used according to the invention may be monomeric anhydrides such as alkyl hexahydrophthalic anhydride wherein the alkyl group has up to 7 carbon atoms, e.g., methylhexahydrophthalic anhydride, succinic anhydride, methylsuccinic anhydride, dodecenylsuccinic anhydride, octadecenylsuccinic anhydride, phthalic anhydride, tetrahydrophthalic anhydride, methyltetrahydrophthalic anhydride, tetrachlorophthalic anhydride, endomethylene tetrahydrophthalic anhydride, chlorendic anhydride, itaconic anhydride, citraconic anhydride, and maleic anhydride. The anhydride may also be polymeric, such as copolymers of maleic anhydride with other ethylenically unsaturated monomers. Such copolymers are preferably formed in the same manner as the acid-functional copolymers previously discussed.

A solvent may optionally be utilized in the coating compositions used in the practice of the present invention. Although the compositions used according to the present invention may be utilized, for example, in the form of substantially solid powder, or a dispersion, it is often desirable that the composition is in a substantially liquid state, which can be accomplished with the use of a solvent. This solvent should act as a solvent with respect to both the carbamate-functional polymer (a) as well as the component (b). In general, depending on the solubility characteristics of components (a) and (b), the solvent can be any organic solvent and/or water. In one preferred embodiment, the solvent is a polar organic solvent. More preferably, the solvent is a polar aliphatic solvent or polar aromatic solvent. Still more preferably, the solvent is a ketone, ester, acetate, aprotic amide, aprotic sulfoxide, or aprotic amine. Examples of useful solvents include methyl ethyl ketone, methyl isobutyl ketone, m-amyl acetate, ethylene glycol butyl ether-acetate, propylene glycol monomethyl ether acetate, xylene, N-methylpyrrolidone, or blends of aromatic hydrocarbons. In another preferred embodiment, the solvent is water or a mixture of water with small amounts of aqueous co-solvents.

In a preferred embodiment of the invention, the solvent is present in the compositions in an amount of from about 0.01 weight percent to about 99 weight percent, preferably from about 10 weight percent to about 60 weight percent, and more preferably from about 30 weight percent to about 50 weight percent.

Coating compositions can be coated on the article by any of a number of techniques well-known in the art. These include, for example, spray coating, dip coating, roll coating, curtain coating, and the like. For automotive body panels, spray coating is preferred.

If the color-plus-clear composite coating is to be used as a topcoat, such as an automotive topcoat, or other coating that will be subject to outdoor exposure it may be desirable to include one or more compounds to forestall degradation by UV light. Many varieties of compounds are utilized in this regard, and specifically there may be mentioned UV light absorbers like benzotriazoles, benzotriazines, and oxalamides; light stabilizers such as hindered amines or hindered amides; and antioxidants such as metal compounds (e.g., nickel complexes of alkylated phenol phosphonates) or hindered phenols such as 4-methyl-2,6-di-t-butylphenol.

It is permissible and often desirable to include in the coating compositions small amounts of rheology control agents, for example, acrylic microgels, fumed silicas, or cellulosics like cellulose acetate butyrate. Such materials are usually used at levels of less than 10% based on the total solid weight of reactants. Other materials used for surface modification, like polydimethylsiloxanes or polybutyl acrylate, are typically used in much lower amounts, usually not exceeding 1 or 2% based on the total solid weight of reactants.

The substrate to which the color-plus-clear coating of this invention is to applied may be, for example, metal, ceramic, plastic, glass, paper, or wood. The substrate may also be any of the aforementioned materials precoated with this or another coating composition. The coating compositions of this invention have been found to be particularly useful over precoated steel or plastic substrates in automotive applications. They are particularly suited to use over primed automotive substrates.

In a preferred embodiment of the invention, the clear coat coating composition is applied wet-on-wet over the color basecoat layer. By the term "wet-on-wet" it is meant that after application the basecoat is allowed to flash, or dry, to remove most of the solvent, but it is not cured before the clear coat composition is applied. After the clearcoat composition is applied, it is allowed to flash or dry for a period of time. Then the base coat and the clear coat are cured together, After an article is coated with the above-described layers, the composition is subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 60° C. and 177° C., and are preferably between 120° C. and 150° C. The curing time will vary depending on the particular components used, and physical parameters such as the thickness of the layers, however, typical curing times range from 15 to 60 minutes.

The invention is further described in the following examples.

Preparation 1—Uncatalyzed Basecoat Composition

A basecoat composition having no cure catalyst was prepared having the following composition:

| | |
|---|---|
| Acrylic Resin 1 - poly(styrene-co-butyl methacrylate-co-ethylhexyl acrylate-co-ε-caprolactone modified hydroxyethyl acrylate-co-acrylic acid) (34:20:15:24:7) (74% non-volatile content) | 1380.3 g |
| hexamethoxymethylol melamine (Resimene ® 747) | 630.6 g |
| acrylic microgel rheology control agent | 929.6 g |
| fumed silica (dispersed in Acrylic Resin 1 and solvent) | 339.8 g |
| poly(n-butyl acrylate) | 12.2 g |
| benzotriazole UV absorber (Tinuvin ® 1130) | 61.9 g |
| barium sulfate (dispersed in Acrylic Resin 1 and solvent) | 515.5 g |
| carbon black (dispersed in Acrylic Resin 1 and solvent) | 1715.8 g |

EXAMPLES 1–5

Coating compositions were prepared utilizing the components and amounts (in grams) as set forth in Table 1 below by combining the uncatalyzed basecoat composition of Preparation 1 with a blend of the acid cure catalyst dinonylnaphthalene disulfonic acid (DNNDSA) having a 55% non-volatile content and an amine stabilizing agent. The compositions were thinned with amyl acetate to adjust viscosity for spray application.

TABLE 1

| Example | Invention/Comparison | Amine | Amine Amount | Basecoat Amount | DNNDSA Amount |
|---|---|---|---|---|---|
| 1 | Inv. | dimethyl dodecylamine | 2.61 | 359 | 3.2 |
| 2 | Inv. | dimethyl octylamine | 1.96 | 359 | 3.2 |
| A | Comp. | pyridine | 0.94 | 359 | 3.2 |
| B | Comp. | dimethyl butylamine | 1.21 | 359 | 3.2 |
| 3 | Inv. | dimethyl dodecylamine | 3.26 | 449 | 4.0 |
| 4 | Inv. | cocoamine | 3.21 | 449 | 4.0 |
| 5 | Inv. | 3-($C_8$–$C_{10}$ alkoxy) propylamine | 3.20 | 449 | 4.0 |
| C | Comp. | butylamine | 1.08 | 449 | 4.0 |
| D | Inv. | 2-ethylhexyl amine | 1.95 | 449 | 4.0 |

The above-described basecoat compositions were coated onto primed steel panels as part of a composite color-plus-clear coating, and then cured. The clearcoat composition contained an epoxy-functional acrylic polymer, poly(glycidyl methacrylate-co-2-ethylhexyl acrylate-co-styrene-co-methyl methacrylate-co-isobornyl methacrylate-co-2-ethylhexyl methacrylate-co-hydroxyethyl methacrylate) (56.8:17.3:19.1:3.0:1.8:1.8:0.2) as a 64.5% nonvolatiles dispersion in a mixture of N-pentyl proprionate/methylisoamyl ketone. The acid crosslinking agent was the reaction product of 1 mole trimethylolpropane and 3 moles methyl hexahydrophthalic anhydride, as a 73% nonvolatiles dispersion in isobutanol. The weight percent formulation of the clearcoat was as follows:

|  |  |
|---|---|
| epoxy-functional acrylic polymer | 42.92% |
| acid crosslinking agent | 24.36% |
| fumed silica dispersion | 10.22% |
| Exxate 800 ® (oxohexyl acetate) | 7.98% |
| Tinuvin 384B ® (UV light stabilizer) | 1.68% |
| Tinuvin 123 ® (HALS) | 0.53% |
| acrylic flow additive | 0.53% |
| propylene carbonate | 4.79% |
| methyl isoamyl ketone | 3.99% |
| isobutanol | 5.64% |

The clearcoat ingredients were the same for each example, however, the age of the clearcoat composition for the set of Examples 1–2, A, and B was different than that for the set of Examples 3–5, C, and D. As the properties of this clearcoat can change with age, comparisons are made within each set, but not between sets.

After cure, the coatings were evaluated for pops/blowouts. The results in pops/in$^2$ are set forth Tables 2 and 3 below.

TABLE 2

| Example | Invention/Comparison | Pops/in$^2$ |
|---|---|---|
| 1 | Inv. | 9 |
| 2 | Inv. | 139 |
| A | Comp. | 281 |
| B | Comp. | 274 |

TABLE 3

| Example | Invention/Comparison | Pops/in$^2$ |
|---|---|---|
| 1 | Inv. | 2 |
| 2 | Inv. | 0 |
| 3 | Inv. | 0 |
| C | Comp. | 31 |

TABLE 3-continued

| Example | Invention/Comparison | Pops/in$^2$ |
|---|---|---|
| D | Inv. | 18 |

As shown in the above tables, the composite coatings according to the invention exhibited significantly fewer pops/blowouts than the comparison coatings.

The invention has been described in detail with reference to preferred embodiments thereof. It should be understood, however, that variations and modifications can be made within the spirit and scope of the invention.

What is claimed is:

1. A method of coating a substrate with a composite coating, comprising the steps of:
    (a) applying a coating composition comprising:
        (1) a polymer component having active hydrogen-containing groups thereon,
        (2) an aminoplast curing agent,
        (3) an acid cure catalyst, and
        (4) a substituted or unsubstituted alkyl amine having at least one alkyl substituent of at least 8 carbon atoms, and
    (b) applying, on top of the coating composition (a), a clear coating composition comprising an epoxy-functional component and an acid-functional or anhydride-functional component.

2. A method according to claim 1 wherein said alkyl substituent has at least 12 carbon atoms.

3. A method according to claim 1 wherein the epoxy-functional component is an epoxy-functional acrylic polymer or oligomer.

4. A method according to claim 3 wherein the clear layer of the composite coating is derived from a curable coating composition comprising an epoxy-functional component and an acid-functional component.

5. A method according to claim 1 wherein the clear layer of the composite coating is derived from a curable coating composition comprising an epoxy-functional component and an acid-functional component.

6. A method according to claim 1 wherein the acid cure catalyst is a strong Bronsted acid.

7. A method according to claim 6 wherein the acid cure catalyst is an aromatic sulfonic acid, 8. A method according to claim 1 wherein the acid cure catalyst is a Lewis acid, 9. A method according to claim 1 wherein the active hydrogen-containing groups are hydroxyl groups.

10. A method according to claim 9 wherein the polymer component (a) is an acrylic polymer.

11. A method according to claim 1 wherein the polymer component (a) is an acrylic polymer, 12. A method according to claim 1 wherein the alkyl amine is a primary amine.

13. A method according to claim 1 wherein the alkyl amine is a tertiary amine.

* * * * *